United States Patent [19]

Gillies

[11] Patent Number: 4,841,357
[45] Date of Patent: Jun. 20, 1989

[54] DATA COMPANDER FOR DIGITAL VIDEO SIGNALS

[75] Inventor: David Gillies, Strasbourg, France

[73] Assignee: Deutsche ITT Industries GmbH, Freiburg, Fed. Rep. of Germany

[21] Appl. No.: 166,529

[22] Filed: Feb. 24, 1988

[30] Foreign Application Priority Data

Mar. 7, 1987 [EP] European Pat. Off. ........ 87103281.9

[51] Int. Cl.$^4$ .............................................. H04N 9/44
[52] U.S. Cl. .................................... 358/17; 358/21 R
[58] Field of Search ........................... 358/21 R, 17, 19

[56] References Cited

U.S. PATENT DOCUMENTS 4,612,568 9/1986 den Hollander et al. ............. 358/19
4,700,217 10/1987 Balaban et al. ....................... 358/23

FOREIGN PATENT DOCUMENTS 0177320 4/1986 European Pat. Off. .
0196826 10/1986 European Pat. Off. .

OTHER PUBLICATIONS

Fernseh & Kino Technik, Band 40, No. 4, Apr. 1986, pp. 141-146, Heidelberg, DE, by T. Nillesen: "Digitaler TV-Farbdecoder mit Zeilenfrequenzverkopplung".

Primary Examiner—John W. Shepperd
Assistant Examiner—Robert M. Bauer
Attorney, Agent, or Firm—Thomas L. Peterson

[57] ABSTRACT

A data compander for digital video signals wherein the sampling frequency is locked to the chrominance-subcarrier frequency. The data compander includes the following cascaded subcircuits: a lock-mode-changing filter which changes the lock of the video signals with the chrominance subcarrier into signals whose clock frequency is locked to the line frequency; an (a/b)-decimation filter, where a, b are integers, and a is less than b; a first peaking filter; a utilization circuit for the line-locked signals; a (b/a)-interpolation filter; a lock-mode-reversing filter which changes the lock of the signals with the line frequency; and a second peaking filter.

11 Claims, 5 Drawing Sheets

DATA COMPANDER FOR DIGITAL VIDEO SIGNALS

FIELD OF THE INVENTION

The present invention relates to a data compander for digital video signals whose sampling frequency is locked to the chrominance-subcarrier frequency.

DESCRIPTION OF THE PRIOR ART

Data companders are needed, for example, if the video signals are to be stored temporarily, e.g., for one field or frame period, to obtain a flicker-free picture. Since today's television signals always contain vertical lines in addition to texts (teletext), it is absolutely necessary to ensure that in the transmitted signal, for example, picture elements located one above the other are reproduced vertically, i.e., that parts of vertical lines, e.g., of letters, are not staggered to the left or right, which would result in the entire vertical line being displayed as a wiggly line.

The processing of digital video signals whose sampling frequency is locked to the chrominance-subcarrier frequency offers the known advantages, e.g., that chrominance demodulation can be performed in a very simple manner by sampling the analog video signals at four times the chrominance-subcarrier frequency and converting them from analog to digital form. With such digital video signals locked to the chrominance subcarrier, the desired vertical reproduction of vertical lines cannot always be achieved, however.

Another way of producing digital video signals is to digitize the video signals on the basis of a sampling pattern locked to the horizontal line frequency. With line-locked video signals it is always ensured that vertical lines are reproduced as vertical lines.

During the reception of transmitted video signals, the chrominance-subcarrier synchronization generally ensures that vertical lines are reproduced vertically even with a sampling pattern locked to the chrominance subcarrier, but today's television sets must also be capable of processing nonstandard video signals or noisy video signals.

The invention ensures that picture elements lying one above the other in the vertical direction are stored in this form, so that during readout from the buffer for temporarily storing the video signals, the desired vertical alignment of the picture elements, which is an essential requirement for the production of a flicker-free picture, is guaranteed. Thus, even in the presence of noisy or nonstandard video signals, only picture elements vertically associated with one another will be stored in the buffer, so that regardless of the kind and quality of the analog video signals, the output signals of the buffer will be digital signals related to a line-locked sampling pattern. These digital signals are then changed into digital signals related to the sampling pattern locked to the chrominance subcarrier.

SUMMARY OF THE INVENTION

The present invention is a data compander for digital video signals having a sampling frequency and a chrominance-subcarrier frequency, wherein the sampling frequency is locked to the chrominance-subcarrier frequency. The data compander includes a lock-mode-changing filter. The input of the lock-mode-changing filter receives the video signals. The lock-mode-changing filter changes the lock of the video signals having the chrominance subcarrier into signals having their clock frequency locked to the line frequency. The data compander further includes an (a/b)-decimation filter, wherein a and b are integers with the integer a less than the integer b. The input of the (a/b)-decimation filter is connected to the output of the lock-mode-changing filter. A first peaking filter is included. The input of the first peaking filter is connected to the output of the (a/b)-decimation filter. The compander further includes a utilization circuit for the line-locked signals. The utilization circuit has an input connected to the output of the first peaking filter. A (b/a)-interpolation filter is also included. The (b/a)-interpolation filter has an input connected to the output of the utilization circuit. The data compander also includes a lock-mode-reversing filter. The input of the lock-mode-reversing filter is connected to the output of the (b/a)-interpolation filter. The lock-mode-reversing filter changes the line lock of the signals into a lock with the chrominance-subcarrier frequency. A second peaking filter is also included. The second peaking filter has an input connected to the output of the lock-mode-reversing filter. The output of the second peaking filter provides the companded video signals.

BRIEF DESCRIPTION OF THE DRAWINGS

The invention will now be explained in greater detail with reference to the accompanying drawings, in which:

FIG. 2 shows an embodiment of the lock-mode-changing filter used in the invention;

FIG. 3 shows an embodiment of the (a/b)-decimation filter used in the invention;

FIG. 4 shows an embodiment of the first peaking filter used in the invention;

FIG. 5 shows an embodiment of the (b/a)-interpolation filter used in the invention, and FIG. 6 shows an embodiment of the second peaking filter used in the invention.

DETAILED DESCRIPTION OF THE PREFERRED EMBODIMENT

Figure 1:
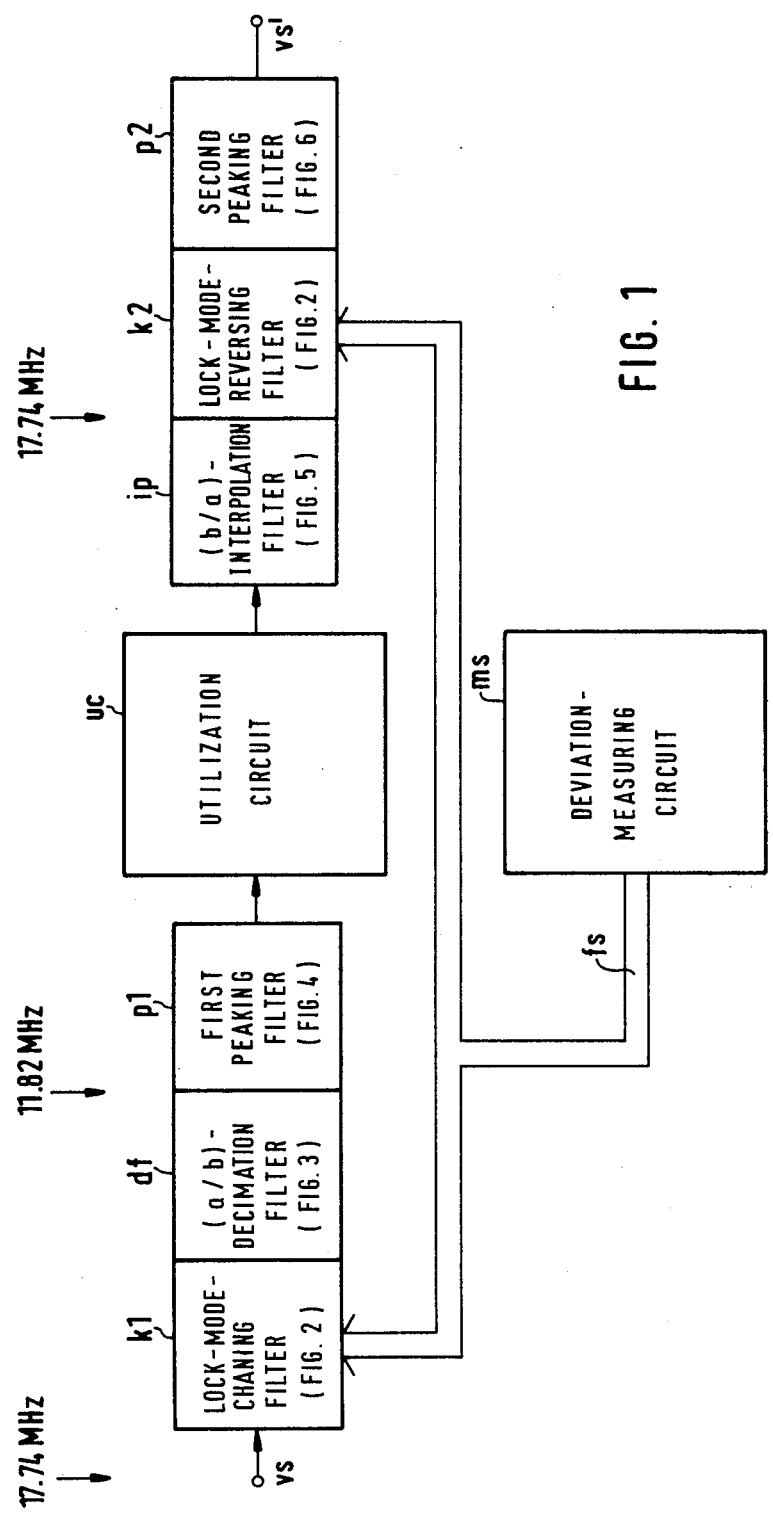
FIG. 1 shows schematically how

The general sketch of FIG. 1 shows how subcircuits of FIGS. 2 to 7 and further circuits cooperate. In the direction of signal flow, the subcircuits are connected in series, as follows: an input for the digital video signals vs is followed in order by a lock-mode-changing filter k1; a (a/b)-decimation filter df, where a, b are integers, and a is less than b; a first peaking filter p1; a circuit uc in which the line-locked signals are used (henceforth called "utilization circuit"); a (b/a)-interpolation filter ip; a lock-mode-reversing filter k2; and a second peaking filter p2, whose output provides the companded video signals vs'.

The utilization circuit uc may contain the above-mentioned buffer and ancillary circuits required to efficiently operate the buffer, such as redundancy-restoring data expansion circuits at the output end. Such ancillary circuits can be implemented with conventional differential-pulse-code modulators and demodulators.

FIG. 1 also shows schematically a deviation-measuring circuit ms, which produces an error signal fs. The deviation-measuring circuit ms may be, for example, the synchronizing circuit required in any television set to generate the horizontal and vertical deflection signals, a part thereof, or a circuit functionally related thereto. In any case, the deviation-measuring circuit ms provides the n-bit error signal fs, which is preferably a 5-bit signal and present in the pure binary code. The error signal fs is proportional to the time deviation of the video signals of a line from the sampling pattern, the deviation being measured in parts of the sampling period $1/f$ (where f is the sampling frequency). The error signal fs may come, for example, from the filter present in the above-mentioned synchronizing circuit at the output of a phase comparator stage which compares the frequency of the horizontal deflection oscillator with that of the received horizontal synchronizing pulses. The error signal fs is fed to the lock-mode-changing filter k1 and the lock-mode-reversing filter k2 in a manner to be explained later.

Figure 2:
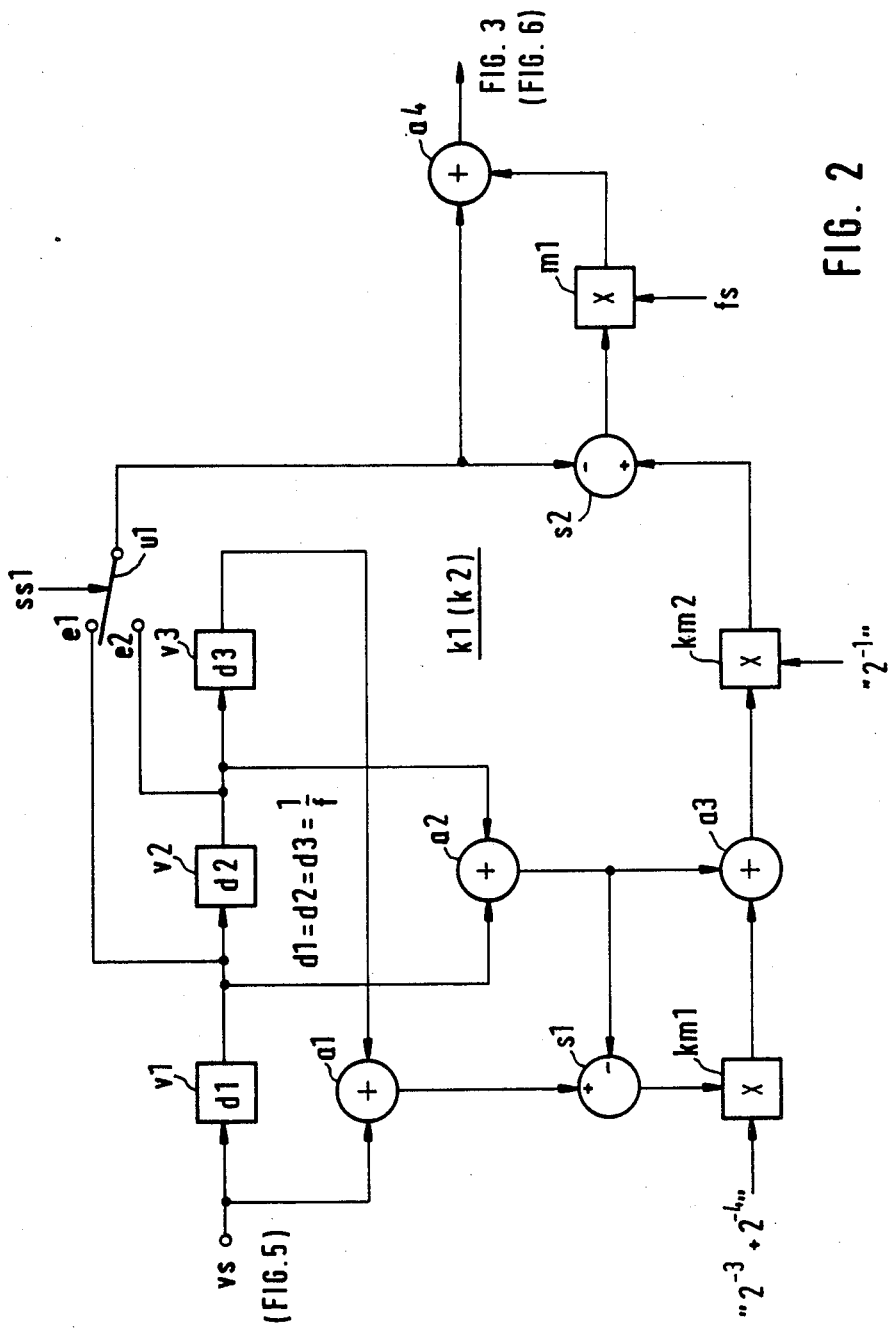
FIGS. 2 to 6 are connected with one another.

FIG. 2 shows a preferred embodiment of the lock-mode-changing filter k1 and the lock-mode-reversing filter k2. As in FIGS. 3 to 6, to be discussed below, FIG. 2 is drawn in the manner of the usual digital filter circuit diagram, in which the essential parts, namely delay elements, adders, subtracters, and multipliers are illustrated by corresponding symbols which are interconnected by simple connecting lines. However, those skilled in the digital filter art are aware that these connecting lines are actually buses, i.e., groups of conductors, over which parallel digital data are transmitted, preferably in clocked form.

In the embodiment of FIG. 2, the lock-mode-changing filter k1 (lock-mode-reversing filter k2) comprises first, second and third delay elements v1, v2, v3; first, second, third and fourth adders a1, a2, a3, a4; first and second subtracters s1, s2; first and second constant multipliers km1, km2; a first multiplier m1; and a first changeover switch u1. The three delay elements v1, v2, v3 are cascaded with the input of the first delay element v1 being fed with the digital video signals vs, which, as mentioned above, are related to a chrominance-subcarrier-locked sampling system. Corresponding first, second and third delays d1, d2, d3, are provided by the first, second and third delay elements v1, v2, v3, respectively. Each of the three delays is equal to the sampling period $1/f$, so that at a given time three successive data words of the video signal vs are available simultaneously at the outputs of the three delay elements.

The first input of the first adder a1 is connected to the input of the first delay element v1 and is thus fed with the video signal vs, while the second input of the first adder is connected to the output of the delay element v3.

The two inputs of the second adder a2 are connected to the input and the output, respectively, of the second delay element v2. The first and the second inputs e1, e2 of the first changeover switch u1 are also connected to these two circuit points.

The minuend input of the first subtracter s1 is connected to the output of the first adder a1, and the subtrahend input of the first subtracter s1 is connected to the output of the second adder a2. The output of the first subtracter s1 thus provides the difference between the outputs from the first and second adders a1, a2. The first constant multiplier km1 multiplies the output signal of the firsat subtracter s1 by a digital word which is equivalent to decimal number $2^{-3}+2^{-4}$. If this digital word is present in the pure binary code, this multiplication, like the other multiplications to be explained below, can be implemented with simple circuits by shifting. Such circuits are familiar to those skilled in the art.

The output of the second adder a2 and the output of the first constant multiplier k1 are each coupled to one of the inputs of the third adder a3. The output of the third adder a3 is connected to the minuend input of the second subtracter s2 via the second constant multiplier km2, which multiples by a digital word equivalent to decimal number $2^{-1}$. The subtrahend input of the second subtracter s2 is connected to the output of the first changeover switch u1, which is also coupled to one of the two inputs of the fourth adder a4. The other input of the fourth adder a4 is fed from the output of the first multiplier m1. One input of the first multiplier m1 is connected to the output of the second subtracter s2, while the other input is fed with the error signal fs as follows. By shifting $n-1$ places to the right, a binary fraction with $n-1$ digits behind the point is formed, with the binary fractions assigned to decimal $2^{n-1}+1$ to $2^n-1$ being mirror-symmetrically equal to the binary fractions assigned to decimal numbers $2^{n-1}-1$ to 0 with respect to $2^{n-1}$. If n=5, for example, the error signal is a five-digit signal and covers the decimal numerical range from 0 through 31. The binary numbers belonging to each of these integers are shifted four places to the left, so that the binary number 01010 (=decimal 10), for example, is converted into the binary number 0.1010 (=decimal 0.625).

Since five-digit binary words can only be converted into binary fractions with four digits behind the point (the fifth digit is the 0 as the digit in front of the point) in the embodiment of FIG. 2, reflection at the value $2^4$ (=decimal 16) is provided for, so that the binary fraction chosen, 0.1010, also belongs to the binary number for decimal 22.

To switch between the two inputs e1, e2 of the first changeover switch u1, a control signal ss1 is applied to the first changeover switch u1. The control signal ss1 causes the first input e1 to be connected to the output if the video signals vs of a line show a deviation from the sampling pattern which lies in the first half of the sampling period. The error signal fs is a measure of this deviation within a sampling period. With the five-digit error signal fs, this deviation can thus be measured in 32 equidistant parts of the sampling period.

Figure 3:
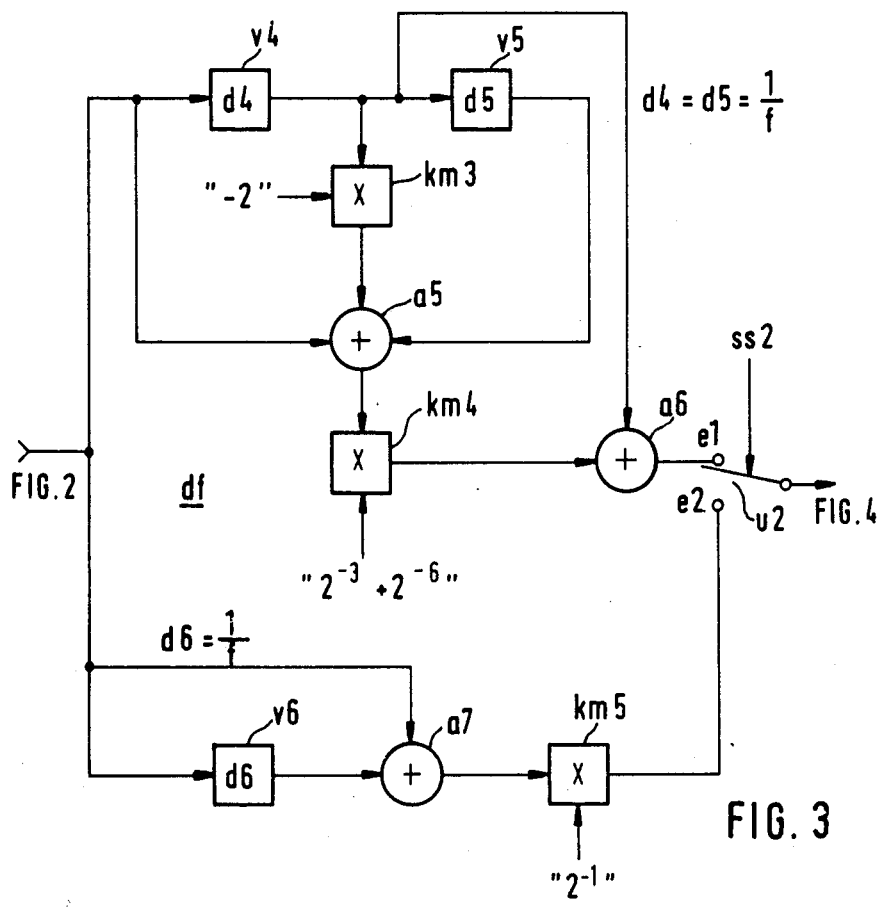

FIG. 3 shows a preferred embodiment of the (a/b)-decimation filter df for the case where a=2 and b=3. It consists of fourth, fifth and sixth delay elements v4, v5, v6; fifth, sixth and seventh adders a5, a6, a7; third, fourth and fifth constant multipliers km3, km4, km5; and a second changeover switch u2.

Fourth and fifth delays d4, d5 are provided by the series-connected fourth and fifth delay elements v4, v5, respectively. The fourth and fifth delys are each equal to the sampling period $1/f$. The output of the fourth delay element v4 is connected to the input of the third constant multiplier km3, which multiplies by a digital word equivalent to decimal $-2$. The output of the third constant multiplier km3 is coupled to one of the three inputs of the fifth adder a5. The two other inputs of the fifth adder a5 are connected to the input of the fourth delay element v4 and to the output of the fifth delay element v5, respectively. The output of the fifth adder a5 passes through the fourth constant multiplier km4, which multiplies the output of the fifth adder a5 by a digital word equivalent to decimal number $2^{-3}+2^{-6}$. The output of the fourth constant multiplier km4 is connected to one input of the sixth adder a6, whose other input is connected to the output of the fourth delay element v4.

The input of the (a/b)-decimation filter df of FIG. 3 (i.e., the output of the lock-mode-changing filter k1 of FIG. 2) is connected to the input of the fourth delay element v4 and to the input of the sixth delay element v6. The sixth delay element v6 provides a delay d6 equal to the sampling period $1/f$. The input of the (a/b)-decimation filter df is also connected to one of the two inputs of the seventh adder a7. The other input of the seventh adder a7 is connected to the output of the sixth delay element v6. The output of the seventh adder a7 is coupled to the input of the fifth constant multiplier km5, which is multiplies by a digital word equivalent to the decimal number $2^{-1}$. The output of the fifth constant multiplier km5 is coupled to the second input e2 of the second changeover switch u2. The second changeover switch u2 is controlled by a control signal ss2. The control signal ss2 is a square-wave signal (i.e., having a 1:1 mark/space ratio) whose frequency is equal to one third of the sampling frequency f.

Figure 4:
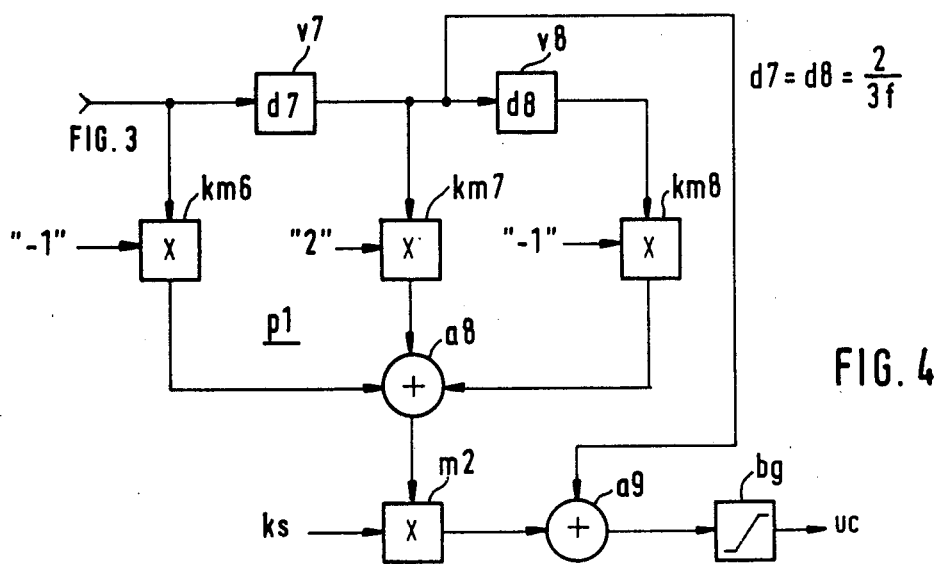

FIG. 4 shows a preferred embodiment of the first peaking filter p1. It comprises seventh and eighth delay elements v7, v8; sixth, seventh and eighth constant multipliers km6, km7, km8; eighth and ninth adders a8, a9; a second multiplier m2; and a limiter bg. The seventh and eighth delay elements v7, v8 are connected in series, and each of them provides a respective seventh and eighth delay d7, d8. Each of the seventh and eighth delays is equal to $\frac{2}{3}$ of the sampling period, i.e. $2/(3f)$. The input of the first peaking filter p1 is connected to the input of the seventh delay element v7 and to the input of the sixth constant multiplier km6. The sixth constant multiplier km6 multiplies the input of the first peaking filter p1 by a digital word equivalent to the number $-1$. The input of the seventh constant multiplier km7, which multiplies by a digital word equivalent to the decimal number 2, is connected to the output of the seventh delay element v7. The input of the eighth constant multiplier km8, which multiplies by a digital word equivalent to the number $-1$, is connected to the output of the delay element v8.

The three inputs of the eighth adder a8 are connected to the outputs of the sixth, seventh and eighth constant multipliers km6, km7, and km8, respectively. The output of the eighth adder a8 is coupled through the second multiplifer m2 to one of the two inputs of the ninth adder a9, whose other input is connected to the output of the seventh delay element v7. The output of the seventh delay element v7 passes through the number-of-bits limiter bg to the output of the first peaking filter p1, and, thus, to the utilization circuit uc.

The second input of the second multiplier m2 is fed with a correction signal ks, which is formed from the five-digit error signal fs according to the following table, in which the binary numbers have been replaced by corresponding decimal numbers to permit a better understanding:

| fs | $2^7 ks$ |
|---|---|
| 1, 31 | 24 |
| 2, 30 | 25 |
| 3, 29 | 27 |
| 4, 28 | 29 |
| 5, 27 | 32 |
| 6, 26 | 34 |
| 7, 25 | 36 |
| 8, 24 | 40 |
| 9, 23 | 43 |
| 10, 22 | 47 |
| 11, 21 | 50 |

-continued

| fs | $2^7 ks$ |
|---|---|
| 12, 20 | 51 |
| 13, 19 | 53 |
| 14, 18 | 55 |
| 15, 16, 17 | 58. |

Thus, the second multiplier m2, multiplies the output signal of the eighth adder a8 by numbers which are always smaller than one, e.g., $34/2^7 = 34/128$.

Figure 5:
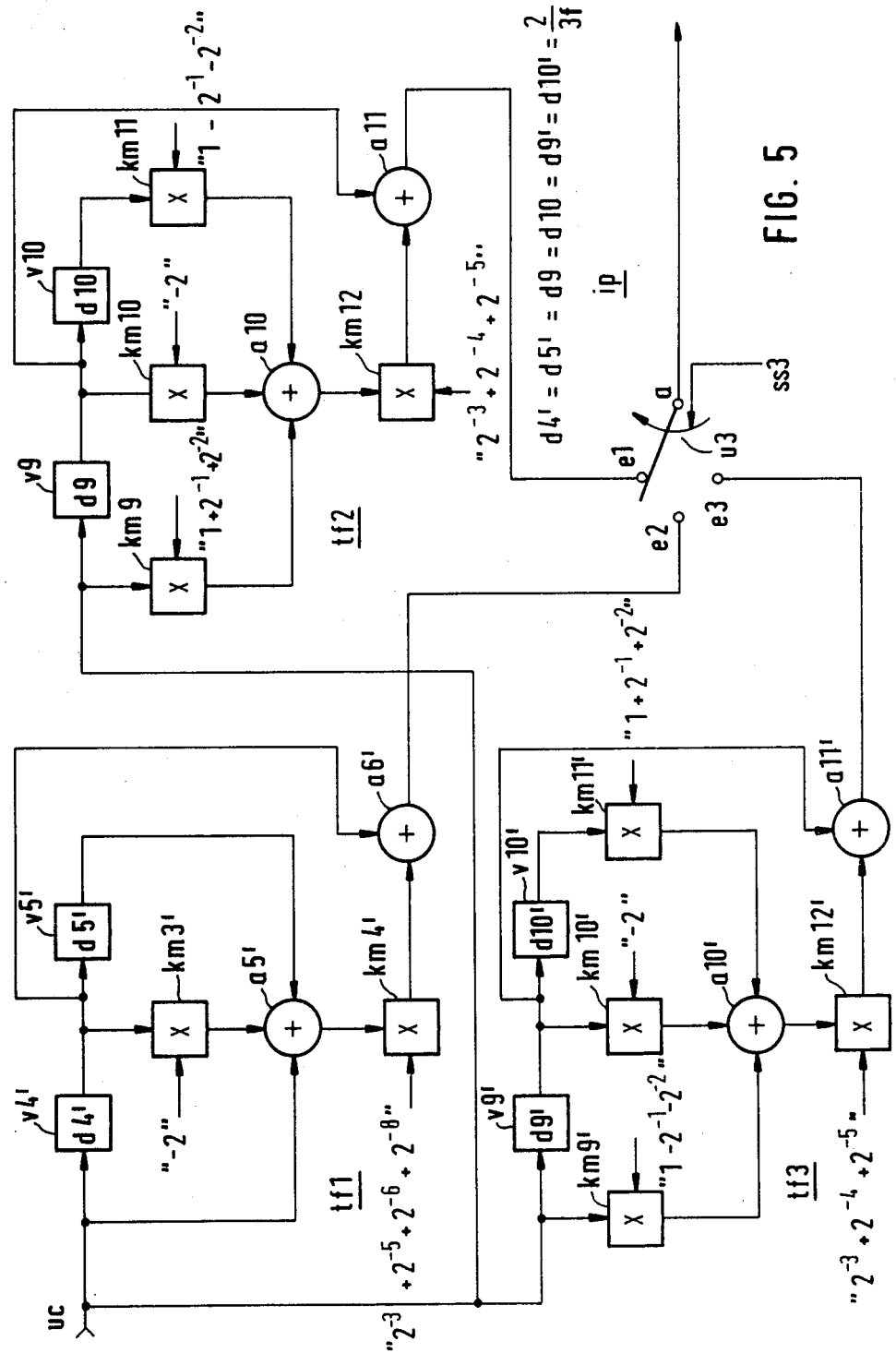

FIG. 5 shows a preferred embodiment of the (b/a)-interpolation filter ip, where $a=2$ and $b=3$ again. The (b/a)-interpolation filter ip consists of first, second and third cascaded filter subnetworks tf1, tf2, tf3 and a third changeover switch u3 with three inputs e1, e2, e3. The general structure of the first filter subnetwork tf1 is similar to the structure of the ($\frac{2}{3}$)-decimation filter df of FIG. 3 except that the first filter subnetwork tf1 does not include elements corresponding to the second changeover switch u2, the switch delay element v6, the seventh adder a7, and the fifth constant multiplier km5. For the elements of the first filter subnetwork tf1 corresponding to the elements of the ($\frac{2}{3}$)-decimation filter df, the reference characters of FIG. 3 have been adopted and provided with a prime.

An essential difference of the first filter subnetwork tf1 from the ($\frac{2}{3}$)-decimation filter of FIG. 3 consists in the fact that the fourth constant multiplier km4' of the first filter subnetwork tf1 multiplies by a digital word equivalent to the decimal number $2^{-3} + 2^{-5} + 2^{-6} + 2^{-8}$. The fourth and fifth delays d4', d5' of the fourth and fifth delay elements v4', v5' are each equal to $\frac{2}{3}$ of the sampling period $1/f$ (i.e., $2/(3f)$), which also applied to ninth and tenth delays d9, d10, d9', d10', of the second and third filter subnetworks tf2, tf3, to be described more fully below. The interconnections of the individual subcircuits of the first filter subnetwork tf1 thus follow from the description of FIG. 3 and will not be described again to avoid repetition.

The second and third filter subnetworks tf2, tf3 have the same structure and differ from the first peaking filter p1 of FIG. 4 only in that the limiter bg is not present. However, the second multiplier m2 of FIG. 4 has been replaced by a twelfth constant multipliers km12 in the second filter subnetwork tf2 and a twelfth constant multiplier km12' in the third filter subnetwork tf3. Furthermore, the digital words fed to ninth, tenth and eleventh constant multipliers km9, km10, km11 in the second filter subnetwork tf2, and to corresponding ninth, tenth and eleventh constant multipliers km9', km10', km11' in the third filter subnetwork tf3 are equivalent to decimal numbers different from those in FIG. 4.

The tenth constant multipliers km10, km10' of the second and third filter subnetworks, tf2 and tf3, respectively, correspond to the seventh constant multiplier km7 of FIG. 4, and are fed with a digital word equivalent to decimal $-2$. The ninth constant multiplier km9 of the second filter subnetwork tf2, and the eleventh constant multiplier km11' of the third filter subnetwork tf3, each multiply by a digital word equivalent to the decimal number $1 + 2^{-1} + 2^{-2}$; while the ninth constant multiplier km9' of the third filter subnetwork tf3 and the eleventh constant multiplier km11 of the second filter subnetwork tf2 multiply by a digital word equivalent to the decimal number $2^{-3} + 2^{-4} + 2^{-5}$.

The interconnections of the individual elements of the second and third filter subnetworks tf2, tf3, follow from the above description of FIG. 4, the respective correspondences being readily apparent from a comparison of FIGS. 4 and 5. For example, the sixth constant multiplier km6 of the first peaking filter p1 of FIG. 4 corresponds to the ninth constant multipliers km9, km9' of the second and third filter subnetworks tf2 and tf3, etc.

The first input e1 of the third changeover switch u3 is connected to the output of the eleventh adder a11 of the second filter subnetwork tf2; the second input e2 of the third changeover switch u3 is connected to the output of the sixth adder a6' of the first filter subnetwork tf1; and the third input e3 of the third changeover switch u3 is connected to the output of the eleventh adder a11' of the third filter subnetwork tf3. The third changeover switch u3 is controlled by a control signal ss3 which has a frequency equal to the sampling frequency f and has a 1:1 mark/space ratio. The control signal ss3 causes the changeover switch to change from any input-output connection made, i.e., e1-a; e2-a, e3-a, to the next input-output connection but one, i.e., from e1-a to e3-a to e2-a to e1-a, in that order.

Figure 6:
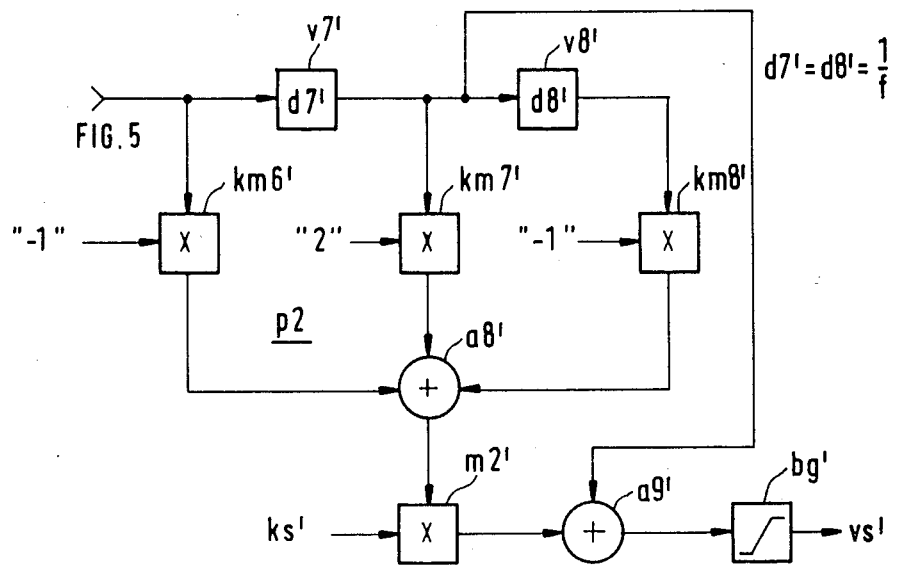

FIG. 6 shows a preferred embodiment of the second peaking filter p2. It differs in its structure from the first peaking filter p1 of FIG. 4 only insignificantly, so that the reference characters of FIG. 4 have again been adopted and provided with a prime. One difference consists in the fact that the seventh delay d7' and the eighth d8' provided by the seventh delay element v7' and the eighth delay element v8', respectively, are each equal to the sampling period $1/f$. The second difference consists in the application to the second multiplier m2' of a correction signal ks' which differs from the correction signal ks applied to the second multiplier m2 of FIG. 4. This correction signal ks' is defined as follows:

| fs | $2^7 ks'$ |
| --- | --- |
| 0 | 39 |
| 1, 31 | 41 |
| 2, 30 | 43 |
| 3, 29 | 45 |
| 4, 28 | 47 |
| 5, 27 | 49 |
| 6, 26 | 51 |
| 7, 25 | 54 |
| 8, 24 | 57 |
| 9, 23 | 60 |
| 10, 22 | 64 |
| 11, 21 | 67 |
| 12, 20 | 71 |
| 13, 19 | 74 |
| 14, 18 | 78 |
| 15, 17 | 82 |
| 16, | 86. |

At values 8, 24, of the error signal fs, the correction signal ks' thus has the decimal value $57/2^7 = 57/128$. The interconnections of the individual parts of the second peaking filter p2 of FIG. 6 follow from the description of FIG. 3.

In a preferred realization of the invention, the sampling frequency f is equal to four times the chrominance-sub-carrier frequency. In the case of the PAL standard, $\frac{2}{3}$ of the sampling frequency will thus be 11.82 MHz, at a sampling frequency 17.74 MHz. In FIG. 1, these frequencies have been entered at the outputs of those subcircuits where they occur for the first time after a change.

What is claimed is:

1. A data compander for digital video signals having a sampling frequency and a chrominance-subcarrier frequency, wherein the sampling frequency is locked to the chrominance-subcarrier frequency, said data compander comprising:

a lock-mode-changing filter having an input and an output, said input receiving said digital video signals as input video signals, said lock-mode-changing filter changing the lock of said input video signals from said chrominance-subcarrier frequency to the line frequency;

an (a/b)-decimation filter, wherein a and b are integers with the integer a less than the integer b, said (a/b)-decimation filter having an input and an output, said input of said (a/b)-decimation filter connected to said output of said lock-mode-changing filter;

a first peaking filter having an input and an output, said input of said first peaking filter connected to said output of said (a/b)-decimation filter;

a utilization circuit for the line-locked signals, said utilization circuit having an input and an output, said input of said utilization circuit connected to said output of said first peaking filter;

a (b/a)-interpolation filter having an input and an output, said input of said (b/a)-utilization filter connected to said output of said utilization circuit;

a lock-mode-reversing filter having an input and an output, said input of said lock-mode-reversing filter connected to said output of said (b/a)-interpolation filter, said lock-mode-reversing filter changing the line lock of the signals into a lock with the chrominance-subcarrier frequency; and a second peaking filter having an input and an output, said input connected to said output of said lock-mode-reversing filter, said output providing the companded video signals.

2. The data compander for digital video signals as defined in claim 1, wherein said lock-mode-changing filter comprises:

first, second, and third delay elements connected in cascade, each of said delay elements having an input and an output, and each of said delay elements providing a delay equal to a sampling period of said sampling frequency locked to said chrominance-subcarrier frequency, said input of said first delay element being said input of said lock-mode-changing filter and receiving said input video signals;

a first adder having first and second inputs and an output, said first input of said first adder connected to said input of first delay element and said second input of said first adder connected to said output of said third delay element;

a second adder having first and second inputs and an output, said first input of said second adder connected to said input of said first delay element, said second input of said first adder connected to said output of said second delay element;

a first changeover switch having first and second inputs and an output, said first input of said first changeover switch connected to said input of said second delay element, said second input of said first changeover switch connected to said output of said second delay element, said first changeover switch controlled by a first control signal;

a first subtracter having a minuend input and a subtrahend input, said minuend input of said first subtracter connected to said output of said first adder and said subtrahend input of said first subtracter connected to said output of said second adder;

a first constant multiplier having an input and an output, said input of said first constant multiplier connected to said output of said first subtracter, said first constant multiplier multiplying said input of said first constant multiplier by a digital word equivalent to the decimal number $2^{-3}+2^{-4}$;

a third adder having first and second inputs and an output, said first and second inputs of said third adder connected to said output of said first constant multiplier and to said output of said second adder, respectively;

a second constant multiplier, having an input and an output, said input of said second constant multiplier connected to said output of said third adder and multiplying said output of said third adder by a digital word equivalent to decimal number $2^{-1}$;

a second subtracter having minuend and subtrahend inputs, said minuend and subtrahend inputs of said second subtracter connected to said output of said second constant multiplier and to said output of said changeover switch, respectively;

a first multiplier having first and second inputs and an output, said first input connected to said output of said second subtracter; and a fourth adder having first and second inputs and an output, said first and second inputs of said fourth adder connected to said output of said first changeover switch and said output of said first multiplier respectively, said output of said fourth adder being the output of said lock-mode-changing filter;

wherein:

said first control signal operates to connect said first input of said first changeover switch to said output of said first changeover switch when the video signals of a line exhibit a deviation from the sampling pattern which lies in the first half of the sampling period, and to connect said second input of said first changeover switch to said output of said first changeover switch when the deviation lies in the second half of the sampling period; and said second input of said first multiplier being fed an n-digit, pure binary error signal which is proportional to the time deviation, measured in parts of the sampling period, of the video signal of a line from the sampling pattern, such that by shifting n−1 places to the right, a binary fraction with n−1 digits behind the point is obtained, with the binary fraction assigned to decimal numbers $2^{n-1}-1$ to 0 with respect to $2^{n-1}$.

3. The data compander for digital video signals as defined in claim 2, wherein n is equal to 5.

4. The data compander for digital video signals as defined in claim 1, wherein said (a/b)-decimation filter comprises:

a fourth delay element and a fifth delay element, each of said fourth and fifth delay elements having a respective input and a respective output with the input of said fifth delay element connected to the output of said fourth delay element, each of said fourth and fifth delay elements providing a delay, equal to a sampling period of said sampling frequency locked to said chrominance-subcarrier frequency, said input of said fourth delay element connected to said output of said lock-mode reversing filter;

a third constant multiplier having an input and an output, said input of third constant multiplier connected to said output of said fourth delay element, said third constant multiplier multiplying said output of said fourth delay element by a digital word equivalent to decimal number −2;

a fifth adder having a first input, a second input, a third input and an output, said first input connected to said input of said fourth delay element, said second input connected to said output of said fifth delay element, and said third input connected to said output of said third constant multiplier;

a fourth constant multiplier having an input and an output, said input of said fourth constant multiplier connected to said output of said fifth adder, said fourth constant multiplier multiplying said output of said fifth adder by a digital word equivalent to the decimal number $2^{-3}+2^{-6}$;

a sixth adder having first and second inputs and an output, said first and second inputs of said sixth adder connected to said outputs of said fourth delay element and said fourth constant multiplier, respectively;

a sixth delay element having an input and an output, said input of said sixth delay element connected to said input of said fourth delay element, said sixth delay element providing a delay equal to the sampling period;

a seventh adder having first and second inputs and an output, said first and second inputs of said seventh adder connected to said input of said fourth delay element and to said output of said sixth delay element, respectively;

a fifth constant multiplier having an input and an output, said input of said fifth constant multiplier connected to said output of said seventh adder, said fifth constant multiplier multiplying said output of said seventh adder by a digital word equivalent to decimal number $2^{-1}$; and a second changeover switch having a first input, a second input and an output, said second changeover switch controlled by a second control signal comprising a square-wave signal having a frequency equal to one-third of the sampling frequency, said first and second inputs of said second changeover switch connected to said output of said sixth adder and said output of said fifth constant multiplier, respectively, said output of said second changeover switch being said output of said decimation filter.

5. The data compander for digital video signals as defined in claim 4, wherein, for said (a/b)-decimation filter, the integer a is equal to 2 and the integer b is equal to 3.

6. The data compander for digital video signals as defined in claim 1, wherein said first peaking filter comprises:

a seventh delay element and an eighth delay element, each of said seventh and eighth delay elements having an input and an output, said input of said seventh delay element connected to said output of said (a/b)-decimation filter, said input of said eighth delay element connected to said output of said seventh delay element, each of said seventh and eighth delay elements providing a delay equal to ⅔ of a sampling period of said sampling frequency locked to said chrominance-subcarrier frequency;

a sixth constant multiplier having an input and an output, said input of said sixth constant multiplier connected to said input of said seventh delay element;

a seventh constant multiplier having an input and an output, said input of said seventh constant multiplier connected to said output of said seventh delay element, said seventh constant multiplier multiplying said output of said seventh delay element by a digital word equivalent to decimal number 2;

an eighth constant multiplier having an input and an output, said input of said eighth constant multiplier connected to said output of said eighth delay element, said eighth constant multiplier multiplying said output of said eighth delay element by a digital word equivalent to the number $-1$;

an eighth adder having first and second inputs and an output, said first input of said eighth adder connected to said output of said sixth constant multiplier, said second input of said eighth adder connected to said output of said seventh constant multiplier;

a second multiplier having first and second inputs and an output, said first input of said second multiplier connected to said output of said eighth adder;

a ninth adder having first and second inputs and an output, said first and second inputs of said ninth adder connected to said output of said second multiplier and said output of said seventh delay element, respectively; and a number-of-digits limiter having an input and an output, said input of said number-of-digits limiter connected to said output of said ninth adder, said output of said number-of-digits limiter being said output of said first peaking filter;

wherein:
said second input of said second multiplier is provided with a correction signal formed from said five-digit error signal according to the following table, in which decimal numbers are given instead of the corresponding binary numbers:

| Error Signal | Correction Signal |
|---|---|
| 1 or 31 | $24/2^7$ |
| 2 or 30 | $25/2^7$ |
| 3 or 29 | $27/2^7$ |
| 4 or 28 | $29/2^7$ |
| 5 or 27 | $32/2^7$ |
| 6 or 26 | $34/2^7$ |
| 7 or 25 | $36/2^7$ |
| 8 or 24 | $40/2^7$ |
| 9 or 23 | $43/2^7$ |
| 10 or 22 | $47/2^7$ |
| 11 or 21 | $50/2^7$ |
| 12 or 20 | $51/2^7$ |
| 13 or 19 | $53/2^7$ |
| 14 or 18 | $55/2^7$ |
| 15 or 16 or 17 | $58/2^7$. |

7. The data compander for digital video signals as defined in claim 1, wherein said second peaking filter comprises:

a seventh delay element and an eighth delay element, each of said seventh and eighth delay elements having an input and an output, said input of said seventh delay element connected to said output of said lock-mode-reversing filter, said input of said eighth delay element connected to said output of said seventh delay element, each of said seventh and eighth delay elements providing a delay equal to a sampling period of said sampling frequency locked to said chrominance-subcarrier frequency;

a sixth constant multiplier having an input and an output, said input of said sixth constant multiplier connected to said input of said seventh delay element;

a seventh constant multiplier having an input and an output, said input of said seventh constant multiplier connected to said output of said seventh delay element, said seventh constant multiplier multiplying said output of said seventh delay element by a digital word equivalent to decimal number 2;

an eighth constant multiplier having an input and an output, said input of said eighth constant multiplier connected to said output of said eighth delay element, said eighth constant multiplier multiplying said output of said eighth delay element by a digital word equivalent to the number $-1$;

an eighth adder having first and second inputs and an output, said first input of said eighth adder connected to said output of said sixth constant multiplier, said second input of said eighth adder connected to said output of said seventh constant multiplier;

a second multiplier having first and second inputs and an output, said first input of said second multiplier connected to said output of said eighth adder;

a ninth adder having first and second inputs and an output, said first and second inputs of said ninth adder connected to said output of said second multiplier and said output of said seventh delay element, respectively; and a number-of-digits limiter having an input and an output, said input of said number-of-digits limiter connected to said output of said ninth adder, said output of said number-of-digits limiter being said output of said second peaking filter;

wherein:
said second input of said second multiplier is provided with a correction signal formed from said five-digit error signal according to the following table, in which decimal numbers are given instead of the corresponding binary numbers:

| Error Signal | Correction Signal |
|---|---|
| 0 | $39/2^7$ |
| 1 or 31 | $41/2^7$ |
| 2 or 30 | $43/2^7$ |
| 3 or 29 | $45/2^7$ |
| 4 or 28 | $47/2^7$ |
| 5 or 27 | $49/2^7$ |
| 6 or 26 | $51/2^7$ |
| 7 or 25 | $54/2^7$ |
| 8 or 24 | $57/2^7$ |
| 9 or 23 | $60/2^7$ |
| 10 or 22 | $64/2^7$ |
| 11 or 21 | $67/2^7$ |
| 12 or 20 | $71/2^7$ |
| 13 or 19 | $74/2^7$ |
| 14 or 18 | $78/2^7$ |
| 15 or 17 | $82/2^7$ |
| 16 | $86/2^7$. |

8. The data compander for digital video signals as defined in claim 1, wherein said (b/a)-interpolation filter comprises:

a first filter subnetwork, comprising:

a fourth delay element and a fifth delay element connected in series, each of said fourth and fifth delay elements having a respective input and a respective output, each of said fourth and fifth delay elements providing a delay equal to two-thirds of a sampling period of said sampling frequency locked to said chrominance-subcarrier frequency, said input of said fourth delay element connected to said output of said utilization circuit;

a third constant multiplier having an input and an output, said input of third constant multiplier connected to said output of said fourth delay element, said third constant multiplier multiplying said output of said fourth delay element by a digital word equivalent to decimal number $-2$;

a fifth adder having a first input, a second input, a third input and an output, said first input connected to said input of said fourth delay element, said second input connected to said output of said fifth delay element, and said third input connected to said output of said third constant multiplier;

a fourth constant multiplier having an input and an output, said input of said fourth constant multiplier connected to said output of said fifth adder, said fourth constant multiplier multiplying said output of said fifth adder by a digital word equivalent to the decimal number $2^{-3}+2^{-5}+2^{-6}+2^{-8}$; and a sixth adder having first and second inputs and an output, said first and second inputs of said sixth adder connected to said outputs of said fourth delay element and said fourth constant multiplier, respectively; second and third filter subnetworks, each of said second and said third filter subnetworks comprising:

a ninth delay element and a tenth delay element, each of said ninth and tenth delay elements having a respective input and output, said input of said tenth delay element connected to said output of said ninth delay element, each of said ninth and tenth delay elements providing a delay equal to two-thirds of the sampling period;

a ninth constant multiplier having an input and an output, said first input of said ninth constant multiplier connected to said input of said ninth delay element;

a tenth constant multiplier having an input and an output, said input of said tenth constant multiplier connected to said output of said ninth delay element, said tenth constant multiplier multiplying said output of said ninth delay element by a digital word equivalent to decimal number $-2$;

an eleventh constant multiplier having an input and an output, said input of said eleventh constant multiplier connected to said output of said tenth delay element, a tenth adder having first, second and third inputs and an output, said first input of said tenth adder connected to said output of said ninth constant multiplier, said second input of said tenth adder connected to said output of said tenth constant multiplier, and said third input of said ninth constant multiplier connected to said output of said eleventh constant multiplier;

a twelfth constant multiplier having an input and output, said input of said twelfth constant multiplier connected to said output of said tenth adder, said twelfth constant multiplier multiplying said output of said tenth adder by a digital word equivalent to decimal number $2^{-3}+2^{-4}+2^{-5}$; and an eleventh adder having first, second and third inputs and an output, said first and second inputs of said eleventh adder connected to said output of said twelfth constant multiplier and to said output of said ninth delay element, respectively, said output of said eleventh adder of said second filter subnetwork being said output of said second filter subnetwork, said output of said eleventh adder of said third filter subnetwork being said output of said third filter subnetwork; wherein:

said ninth constant multiplier of said second filter subnetwork and said eleventh constant multiplier of said third filter subnetwork multiply their respective inputs by a digital word equivalent to decimal number $1+2^{-1}+2^{-2}$; and said ninth constant multiplier of said third filter subnetwork and said eleventh constant multiplier of said second filter subnetwork multiply their respective inputs by a digital word equivalent to decimal number $1-2^{-1}-2^{-2}$; and a three-input changeover switch comprising:

a first input connected to said output of said second filter subnetwork;

a second input connected to said output of said first filter subnetwork;

a third input connected to said output of said third filter subnetwork;

an output; and a control input having a control signal applied thereto, said control signal being a square wave with a frequency equal to said sampling frequency, said three-input changeover switch responsive to said control input to sequentially connect said third input of said three-input changeover switch to said output of said three-input changeover switch, then connect said second input of said three-input change-over switch to said output of said three-input changeover switch, then connect said first input of said three-input changeover switch to said output of said three-input changeover switch, said output of said three-input changeover switch being said output of said (b/a)-interpolation filter.

9. The data compander for digital video signals as defined in claim 8, wherein, for said (b/a)-interpolation filter, the integer a is equal to 2 and the integer b is equal to 3.

10. The data compander for digital video signals as defined in claim 1, wherein said sampling frequency is equal to four times the chrominance-subcarrier frequency of a television standard.

11. The data compander for digital video signals as defined in claim 1, wherein said lock-mode-reversing filter comprises:

first, second, and third delay elements connected in cascade, each of said delay elements having an input and an output, and each of said delay elements providing a delay equal to a sampling period of said sampling frequency locked to said chrominance-subcarrier frequency, said input of said first delay element being said input of said lock-mode-reversing filter and receiving said output of said (b/a)-interpolation filter;

a first adder having first and second inputs and an output, said first input of said first adder connected to said input of first delay element and said second input of said first adder connected to said output of said third delay element;
a second adder having first and second inputs and an output, said first input of said second adder connected to said input of said first delay element, said second input of said first adder connected to said output of said second delay element;
a first changeover switch having first and second inputs and an output, said first input of said first changeover switch connected to said input of said second delay element, said second input of said first changeover switch connected to said output of said second delay element, said first changeover switch controlled by a first control signal;
a first subtracter having a minuend input and a subtrahend input, said minuend input of said first subtracter connected to said output of said first adder and said subtrahend input of said first subtracter connected to said output of said second adder;
a first constant multiplier having an input and an output, said input of said first constant multiplier connected to said output of said first subtracter, said first constant multiplier multiplying said input of said first constant multiplier by a digital word equivalent to the decimal number $2^{-3}+2^{-4}$;
a third adder having first and second inputs and an output, said first and second inputs of said third adder connected to said output of said first constant multiplier and to said output of said second adder, respectively;
a second constant multiplier, having an input and an output, said input of said second constant multiplier connected to said output of said third adder and multiplying said output of said third adder by a digital word equivalent to decimal number $2^{-1}$;
a second subtracter having minuend and subtrahend inputs, said minuend and subtrahend inputs of said second subtracter connected to said output of said second constant multiplier and to said output of said changeover switch, respectively;
a first multiplier having first and second inputs and an output, said first input connected to said output of said second subtracter; and
a fourth adder having first and second inputs and an output, said first and second inputs of said fourth adder connected to said output of said first changeover switch and said output of said first multiplier respectively, said output of said fourth adder being the output of said lock-mode-reversing filter;
wherein:
said first control signal operates to connect said first input of said first changeover switch to said output of said first changeover switch when the video signals of a line exhibit a deviation from the sampling pattern which lies in the first half of the sampling period, and to connect said second input of said first changeover switch to said output of said first changeover switch when the deviation lies in the second half of the sampling period; and
said second input of said first multiplier being fed an n-digit, pure binary error signal which is proportional to the time deviation, measured in parts of the sampling period, of the video signal of a line from the sampling pattern, such that by shifting $n-1$ places to the right, a binary fraction with $n-1$ digits behind the point is obtained, with the binary fraction assigned to decimal numbers $2^{n-1}-1$ to 0 with respect to $2^{n-1}$.

* * * * *